(12) United States Patent
Mitsuhata et al.

(10) Patent No.: US 7,745,530 B2
(45) Date of Patent: Jun. 29, 2010

(54) AQUEOUS EMULSION RESIN COMPOSITIONS

(75) Inventors: Nobuo Mitsuhata, Settsu (JP); Tsunehiko Fuwa, Settsu (JP); Susumu Wada, Settsu (JP); Keiko Kunimasa, Settsu (JP); Haruhiko Mohri, Settsu (JP); Nobuo Fukita, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/481,811

(22) PCT Filed: Jun. 28, 2002

(86) PCT No.: PCT/JP02/06539

§ 371 (c)(1),
(2), (4) Date: Dec. 23, 2003

(87) PCT Pub. No.: WO03/002660

PCT Pub. Date: Jan. 9, 2003

(65) Prior Publication Data

US 2004/0192828 A1    Sep. 30, 2004

(30) Foreign Application Priority Data

Jun. 28, 2001   (JP) ................................ 2001-196848

(51) Int. Cl.
| | |
|---|---|
| C08L 27/12 | (2006.01) |
| C08F 12/20 | (2006.01) |
| C08K 5/24 | (2006.01) |
| C08G 77/28 | (2006.01) |
| C08G 77/14 | (2006.01) |
| C08K 5/06 | (2006.01) |
| C09D 5/03 | (2006.01) |

(52) U.S. Cl. ..................... 524/544; 524/263; 524/545; 524/533; 524/520; 524/522; 525/326.2; 525/342; 525/387; 525/374; 525/504; 525/199; 525/276; 526/249; 526/254; 526/255; 428/421

(58) Field of Classification Search ................. 524/520, 524/544, 263, 533, 522; 525/326.2, 342, 525/387, 374; 428/421; 526/249, 254, 255
See application file for complete search history.

(56) References Cited

U.S. PATENT DOCUMENTS

| | | | | |
|---|---|---|---|---|
| 3,467,638 | A | * | 9/1969 | Pottison ...................... 526/247 |
| 3,694,499 | A | * | 9/1972 | Quarles, Jr. ................. 562/424 |
| 5,548,019 | A |   | 8/1996 | Kawakami et al. |
| 5,804,650 | A |   | 9/1998 | Tsuda et al. |
| 5,880,204 | A | * | 3/1999 | McCarthy et al. ........... 524/520 |
| 5,962,612 | A | * | 10/1999 | Takakura et al. ............ 526/249 |
| 6,221,995 | B1 | * | 4/2001 | Yukio et al. .................... 528/28 |
| 6,506,843 | B1 | * | 1/2003 | Tsuda et al. .................. 525/199 |
| 6,794,027 | B1 | * | 9/2004 | Araki et al. .................. 428/336 |
| 6,806,333 | B2 | * | 10/2004 | Ishida et al. ................. 526/250 |

| | | | | |
|---|---|---|---|---|
| 2002/0165303 | A1 | * | 11/2002 | Wada et al. .................. 524/263 |
| 2004/0197569 | A1 | * | 10/2004 | Jing ............................ 428/421 |

FOREIGN PATENT DOCUMENTS

| | | | |
|---|---|---|---|
| CA | 2 090 144 |   | 8/1993 |
| DE | EP-1160298 A1 | * | 5/2001 |
| EP | 0 271 876 A2 |   | 6/1988 |
| EP | 0 567 154 A1 |   | 10/1993 |
| EP | 0 779 335 A1 |   | 6/1997 |
| EP | 1 160 298 A1 |   | 12/2001 |
| JP | 61-026661 A | * | 2/1986 |
| JP | 63-314202 A |   | 12/1988 |
| JP | 2-132101 |   | 5/1990 |
| JP | 03-181540 A |   | 8/1991 |
| JP | 7-268163 |   | 10/1995 |
| JP | 7-324180 |   | 12/1995 |
| JP | 08-003437 A |   | 1/1996 |
| JP | 8-67795 |   | 3/1996 |
| JP | 09-169933 A |   | 6/1997 |
| JP | 11-029348 |   | 2/1999 |
| JP | EP-1160298 A1 | * | 8/1999 |
| JP | 2000-129195 |   | 5/2000 |
| JP | 2000326441 | * | 11/2000 |

(Continued)

OTHER PUBLICATIONS

Supplementary European Search Report for EP 02 73 8846 dated Aug. 23, 2004.

(Continued)

*Primary Examiner*—Duane Smith
*Assistant Examiner*—Ives Wu
(74) *Attorney, Agent, or Firm*—Sughrue Mion, PLLC

(57) ABSTRACT

The present invention provides an aqueous emulsion resin composition which comprises:
  (a) a resin composition containing at least one fluoroolefin polymer having crosslinkable group(s) at a terminus and/or a side chain of its molecule and at least one non-fluoroolefin polymer having crosslinkable group(s) at a terminus and/or a side chain of its molecule; and
  (b) at least one curing agent selected from the group consisting of isocyanates, melamines, hydrazides, carbodiimides, silanes and epoxides;
and provides an aqueous emulsion resin compositions containing at least one chemically bonded product of a fluoroolefin polymer and a non-fluoroolefin polymer bonded to each other via at least one covalent bond at a terminus and/or a side chain of the molecules wherein one or both of the fluoroolefin polymer and the non-fluoroolefin polymer have crosslinkable group(s).

9 Claims, No Drawings

FOREIGN PATENT DOCUMENTS

| | | |
|---|---|---|
| JP | 2001-072725 | 3/2001 |
| JP | 2001-072819 | 3/2001 |
| JP | EP-1160298 A1 * | 5/2001 |
| JP | 2002-179871 | 6/2002 |
| JP | 2002-179871 A | 6/2002 |
| JP | 2002-194264 | 7/2002 |
| JP | 2002-201227 A | 7/2002 |
| JP | 2002-226764 A | 8/2002 |
| WO | WO99/57209 * | 11/1999 |
| WO | WO-99/57299 * | 11/1999 |
| WO | WO 00/11094 A1 | 3/2000 |

OTHER PUBLICATIONS

International Search Report for PCT/JP02/06539 dated Oct. 8, 2002.

* cited by examiner

AQUEOUS EMULSION RESIN COMPOSITIONS

TECHNICAL FIELD

The present invention relates to aqueous emulsion resin compositions.

BACKGROUND ART

A technique using aqueous fluorinated resin compositions as resins for weather-resistant paints is heretofore known; however, such paints are generally inferior to solvent-based crosslinking type paints with regard to water resistance, solvent resistance, soil-resistance, hardness, etc. To overcome this drawback, the development of aqueous crosslinking type fluorinated resins has been under taken, though not yet completed. Examples of copolymers of crosslinking monomers with chlorotrifluoroethylene, tetrafluoroethylene or hexafluoropropylene are disclosed in U.S. Pat. No. 5,548,019 and Japanese Unexamined Patent Publication No. 1995-324180. However, these are copolymers with non-fluoroolefin monomers, having a relatively large amount of added non-fluoroolefin monomers (about 50 mol %), resulting in resins and coated films of unfavorable quality in terms of durability and weather resistance.

It is known that compositions formed from polyvinylidene fluorides and acrylic polymers having crosslinkable groups can be obtained using techniques disclosed in Japanese Unexamined Patent Publication No. 1995-268163 and Japanese Unexamined Patent Publication No. 2001-72725. However, these compositions exhibit insufficient water resistance, solvent resistance, soil-resistance and hardness because the fluorinated resin does not contain a crosslinkable group and there is thus no chemical bond between the fluorinated resin and the acrylic resin. Presumably, the coated film has a low crosslinking density as a whole and the compatibility between the fluorinated resin and the acrylic resin subjected to crosslinking reaction is low.

The present invention aims at providing an aqueous emulsion resin composition having excellent water resistance, solvent resistance, soil-resistance and hardness.

DISCLOSURE OF THE INVENTION

1. An aqueous emulsion resin composition which comprises:
   (a) a resin composition containing at least one fluoroolefin polymer having crosslinkable group(s) at a terminus and/or a side chain of its molecule and at least one non-fluoroolefin polymer having crosslinkable group(s) at a terminus and/or a side chain of its molecule; and
   (b) at least one curing agent selected from the group consisting of isocyanates, melamines, hydrazides, carbodiimides, silanes and epoxides.

2. A composition according to Item 1, wherein the curing agent is isocyanate, and the combination of the crosslinkable group in the fluoroolefin polymer and the crosslinkable group in the non-fluoroolefin polymer is hydroxyl group (fluoroolefin polymer)/hydroxyl group (non-fluoroolefin polymer), carboxyl group (fluoroolefin polymer)/hydroxyl group (non-fluoroolefin polymer), or sulfonic acid group (fluoroolefin polymer)/hydroxyl group (non-fluoroolefin polymer).

3. A composition according to Item 1, wherein the curing agent is hydrazide, and the combination of the crosslinkable group in the fluoroolefin polymer and the crosslinkable group in the non-fluoroolefin polymer is hydroxyl group (fluoroolefin polymer)/ketone group (non-fluoroolefin polymer), carboxyl group (fluoroolefin polymer)/ketone group (non-fluoroolefin polymer), or sulfonic acid group (fluoroolefin polymer)/ketone group (non-fluoroolefin polymer).

4. A composition according to Item 1, wherein the curing agent is carbodiimide, and the combination of the crosslinkable group in the fluoroolefin polymer and the crosslinkable group in the non-fluoroolefin polymer is hydroxyl group (fluoroolefin polymer)/carboxyl group (non-fluoroolefin polymer), carboxyl group (fluoroolefin polymer)/carboxyl group (non-fluoroolefin polymer), carboxyl group (fluoroolefin polymer)/hydroxyl group (non-fluoroolefin polymer), or sulfonic acid group (fluoroolefin polymer)/carboxyl group (non-fluoroolefin polymer).

5. A composition according to Item 1, wherein the fluoroolefin polymer is polyvinylidene fluoride.

6. A composition according to Item 1, wherein the resin composition is prepared by a seed polymerization method.

7. A composition according to Item 1, wherein the curing agent is PEO-modified isocyanate.

8. An aqueous emulsion resin compositions containing at least one chemically bonded product of a fluoroolefin polymer and a non-fluoroolefin polymer bound to each other via at least one covalent bond formed at a terminus and/or a side chain of the molecules, wherein one or both of the fluoroolefin polymer and the non-fluoroolefin polymer have crosslinkable group(s).

9. A composition according to Item 8 further containing at least one curing agent selected from the group consisting of isocyanates, melamines, hydrazides, carbodiimides, silanes and epoxides.

10. A composition according to Item 8, wherein the combination of the crosslinking group in the fluoroolefin polymer and the functional group in the non-fluoroolefin polymer that can form a covalent bond is at least one pair selected from the group consisting of carboxyl group/epoxy group, carboxyl group/hydroxyl group, carboxyl group/amino group, hydroxyl group/epoxy group, hydroxyl group/isocyanate group, hydroxyl group/carboxyl group, epoxy group/carboxyl group, epoxy group/hydroxyl group, sulfonic acid group/amino group, sulfonic acid group/hydroxyl group, and sulfonic acid group/epoxy group.

11. A composition according to Item 8, wherein the fluoroolefin polymer is polyvinylidene fluoride.

12. A composition according to Item 8, wherein the curing agent is PEO-modified isocyanate.

DETAILED DESCRIPTION OF THE INVENTION

In the present invention, examples of monomers that form fluoroolefin polymers include tetrafluoroethylene (TFE), trifluoroethylene (TrFE), chlorotrifluoroethylene (CTFE), hexafluoropropylene (HFP), vinyl fluoride (VF), vinylidene fluoride (VdF), etc. These monomers may be polymerized singly or in combination of two or more. It is also possible to copolymerize the above-described fluoroolefins with monomers bearing crosslinkable groups. When the fluoroolefin is polymerized alone, it is possible to introduce a crosslinkable group at a terminus of the fluoroolefin polymer by polymerizing it in the presence of a chain transfer agent. A vinylidene fluoride copolymer is preferable as the fluoroolefin polymer.

As vinylidene fluoride copolymers, it is possible to use copolymers, formed only of fluoroolefins, prepared by reacting vinylidene fluoride with one, two or more fluoroolefins other than vinylidene fluoride in the presence of a chain transfer agent, as well as copolymers prepared by copolymerizing a monomer containing both vinylidene fluoride and crosslinkable group(s) with, if necessary, one or more fluoroolefins other than vinylidene fluoride.

Examples of fluoroolefins contained in such vinylidene fluoride copolymers include, for example, tetrafluoroethylene (TFE), trifluoroethylene (TrFE), chlorotrifluoroethylene (CTFE), hexafluoropropylene (HFP), vinyl fluoride (VF), etc. With regard to copolymerization reactivity with VdF monomer, TFE, HFP, CTFE are preferable.

In the vinylidene fluoride copolymers, combinations of vinylidene fluoride and the above-described fluoroolefins other than vinylidene fluoride are, for example, VdF/TFE, VdF/TFE/HFP, VdF/TFE/CTFE, VdF/TFE/TrFE, VdF/CTFE, VdF/HFP, VdF/TFE/HFP/CTFE, etc. Among these, combinations of VdF/TFE, VdF/CTFE and VdF/HFP are preferable.

Preferable examples of the crosslinkable groups contained in the fluoroolefin polymers and non-fluoroolefin polymers of the present invention include hydroxyl group, carboxyl groups, epoxy groups, amino groups, ketone groups, sulfonyl groups, silyl groups, halogen atoms (chlorine, bromine, iodine, preferably bromine or iodine, and particularly iodine), amido groups and their metal salts and ammonium salts. Examples of such metal salts include sodium or potassium salts of carboxyl or sulfonyl groups. Examples of ammonium salts include hydrochlorides, hydrobromides and sulfates of amino groups.

Desirable combinations of crosslinkable groups in the fluoroolefin polymer and crosslinkable groups in the non-fluoroolefin polymer are as follows: hydroxyl group (fluoroolefin polymer)/hydroxyl group (non-fluoroolefin polymer); hydroxyl group (fluoroolefin polymer)/carboxyl group (non-fluoroolefin polymer); hydroxyl group (fluoroolefin polymer)/ketone group (non-fluoroolefin polymer); carboxyl group (fluoroolefin polymer)/carboxyl group (non-fluoroolefin polymer); carboxyl group (fluoroolefin polymer)/hydroxyl group (non-fluoroolefin polymer); carboxyl group (fluoroolefin polymer)/ketone group (non-fluoroolefin polymer); sulfonic acid group (fluoroolefin polymer)/hydroxyl group (non-fluoroolefin polymer); sulfonic acid group (fluoroolefin polymer)/ketone group (non-fluoroolefin polymer); and sulfonic acid group (fluoroolefin polymer)/carboxyl group (non-fluoroolefin polymer).

As crosslinkable-group-containing monomers for copolymerization with fluoroolefins and the method for preparing such polymers, those disclosed in WO95/33782, Japanese Unexamined Patent Publication No. 1996-67795, U.S. Pat. No. 5,548,019, and Japanese Unexamined Patent Publication No. 1995-324180 are usable.

Specifically, the crosslinkable-group-containing monomers include, for example, the monomers in (1) to (3) and (I) to (VII) described below:

$$CH_2=CHO(CH_2)_p(OCH_2CH_2)_q(OCH_2CH(CH_3))_rOH \quad (1)$$

(wherein p is an integer from 1 to 10, q is an integer from 2 to 20, and r is an integer from 0 to 20. The oxyethylene units and oxypropylene units may be arranged in blocks or randomly);

$$CH_2=CHCH_2O(CH_2)_p(OCH_2CH_2)_q(OCH_2CH(CH_3))_rOH \quad (2)$$

(wherein p, q and r are the same as in formula (1), and the oxyethylene units and oxypropylene units may be arranged in blocks or randomly);

$$CH_2=CHO(CH_2)_sO(CO(CH_2)_tO)_uH \quad (3)$$

(wherein s is an integer from 1 to 10, t is an integer from 1 to 10 and u is an integer from 1 to 30);

General formula (I):

$$CF_2=CF(CF_2)_a-Y \quad (I)$$

[wherein a is an integer from 1 to 10 and Y is $SO_3M$ or COOM (with M being H, $NH_4$ or an alkali metal)];

General formula (II):

$$CF_2=CF(CF_2CFX)_b-Y \quad (II)$$

[wherein X is F or $CF_3$, b is an integer from 1 to 5 and Y is $SO_3M$ or COOM (with M being H, $NH_4$ or an alkali metal)];

General formula (III):

$$CF_2=CF-O-(CFX)_c-Y \quad (III)$$

[wherein X is F or $CF_3$, c is an integer from 1 to 10 and Y is $SO_3M$ or COOM (with M being H, $NH_4$ or an alkali metal)];

General formula (IV):

$$CF_2=CF-O-(CF_2CFX-O)_d-CF_2CF_2Y \quad (IV)$$

[wherein X is F or $CF_3$, d is an integer from 1 to 10, and Y is $SO_3M$ or COOM (with M being H, $NH_4$ or an alkali metal)];

General formula (V):

$$CH_2=CFCF_2-O-(CF(CF_3)CF_2-O)_e-CF(CF_3)Y \quad (V)$$

[wherein e is 0 or an integer from 1 to 10, and Y is $SO_3M$ or COOM (with M being H, $NH_4$ or an alkali metal)];

General formula (VI):

$$CF_2=CFCF_2-O-(CF(CF_3)CF_2-O)_f-CF(CF_3)Y \quad (VI)$$

[wherein f is an integer from 1 to 10, and Y is $SO_3M$ or COOM (with M being H, $NH_4$ or an alkali metal)]

General formula (VII):

$$CH_2=CFCF_2-Rf1-(CH_2)_g-X1 \quad (VII)$$

[wherein X1 is $-CH_2OH$, $-COOR1$ (with R1 being H, $C_1$ to $C_6$ alkyl group, Na, K, Li or $NH_4$),

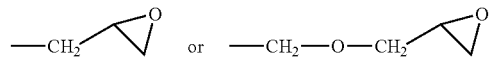

and Rf1 represents a $C_1$ to $C_{40}$ alkylene group having atom/atoms substituted with fluorine or $-ORf2-$ (Rf2 represents a $C_1$ to $C_{40}$ alkylene group having atom/atoms substituted with fluorine or a $C_3$ to $C_{50}$ ether group having atom/atoms substituted with fluorine). g is 0 or an integer from 1 to 6]. Examples of copolymerizable monomers other than those described above include acrylamide and its derivatives, methacrylamide and its derivatives, derivatives of N-methylolacrylamide, ethylcarbitol acrylate, 2-hydroxyethyl acryloyl phosphate, butoxyethyl acrylate, etc.

Sodium, potassium, lithium and the like are usable as an alkali metal.

Examples of alkyl groups having the number of carbon atoms of 1 to 6 include methyl, ethyl, n-propyl, isopropyl, n-butyl, isobutyl, sec-butyl, tert-butyl, pentyl, hexyl and like $C_1$ to $C_6$ alkyl groups having a straight or branched chain.

The percentage of the crosslinkable-group-containing monomer relative to the fluoroolefin copolymer is preferably 30 mol % or less, more preferably 20 mol % or less, still more preferably 0.1 to 10 mol %, and most preferably 0.5 to 5 mol %.

As an alternative method for introducing a crosslinkable group into the fluoroolefin polymer, a chain transfer agent containing a crosslinkable group is used to introduce a crosslinkable group at a terminus of molecules, and this method is preferable. As a chain transfer agent, I—$(CH_2)_n$—I (where n is an integer from 1 to 4) may be used. The usable amount of the chain transfer agent is about 0.01 to 5 parts by weight per 100 parts by weight of fluoroolefin monomer.

In the present invention, a resin composition containing a fluoroolefin polymer and non-fluoroolefin polymer may be prepared by seed polymerization (two step polymerization), and this method is preferable. For example, it is preferable that a non-fluoroolefin monomer be successively added to an emulsion of a fluoroolefin based polymer and the mixture then be subjected to polymerization.

Monomers usable to obtain non-fluoroolefin polymers include, for example, acrylic acid, methacrylic acid, maleic acid, crotonic acid and like unsaturated carboxylic acids; methyl acrylate and like acrylic acid esters, methyl methacrylate (MMA) and like methacrylic acid esters; acrylamide, methacrylamide, N-methylacrylamide, N-methylolacrylamide, N-butoxymethylacrylamide, N-methylolmethacrylamide, N-methylmethacrylamide, N-butoxymethylmethacrylamide and like amides; hydroxyethyl acrylate, hydroxyethyl methacrylate, hydroxypropyl acrylate, hydroxypropyl methacrylate and like hydroxyl-group-containing monomers; glycidyl acrylate, glycidyl methacrylate and like epoxy-group-containing monomers, γ-trimethoxysilane methacrylate, γ-triethoxysilane methacrylate and like silanol-group-containing monomers; acrolein and like aldehyde-group-containing monomers; and monomers represented by the general formula shown below:

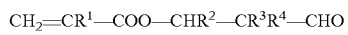

$CH_2$=$CR^1$—COO—$CHR^2$—$CR^3R^4$—CHO (wherein $R^1$ is H or $CH_3$; $R^2$ is H or a $C_1$ to $C_3$ alkyl group; $R^3$ is a $C_1$ to $C_3$ alkyl group; and $R^4$ is a $C_1$ to $C_4$ alkyl group). Specific examples include (meth)acryloxyalkylpropanal, acetonitrile acrylate, diacetone acrylate, diacetone methacrylate, 2-hydroxypropylacrylate-acetylacetate, butanediol-1,4-acrylate-acetylacetate and like acrylmonomers used with crosslinking groups. As vinyl compounds, for example, styrene (St), acrylonitrile, etc., are usable. Usable examples of non-fluoroolefin polymers include homopolymers and copolymers formed from one, two or more of the above-described monomers.

From the viewpoint of compatibility, it is preferable that the non-fluoroolefin monomer that is seed polymerized with the vinylidene fluoride copolymer be an acrylic ester and/or methacrylic acid ester. The polymerization can be conducted in accordance with the method described in Japanese Unexamined Patent Publication No. 2001-72725, or, for example, the method described below may be employed.

The resin composition of the present invention can be prepared by a seed polymerization method wherein at least one non-fluoroolefin monomer is added to a latex of fluoroolefin polymer, and, then subjecting the mixture to polymerization.

It is possible to conduct seed polymerization under the same conditions in which emulsion polymerization is generally conducted. A surfactant, polymerization initiator, chain transfer agent, pH adjustor, and, optionally, solvent and chelating agent, are added to the seed latex. After purging to remove molecular oxygen, the reaction is conducted under an inert atmosphere at atmospheric pressure at about 20 to 90° C., and preferably at about 40 to 80° C., for 0.5 to 6 hours.

When a homopolymer or copolymer of vinylidene fluoride is used as a fluoroolefin polymer, it is preferable that the non-fluoroolefin polymer contain as a main ingredient at least one member selected from acrylic acid esters and methacrylic acid esters. It is possible to introduce crosslinkable group(s) by adding a chain transfer agent or the above-described non-fluoroolefin monomers having crosslinkable group(s). The crosslinkable-group-containing non-fluoroolefin monomers can be added to the amount of 0.01 to 10 parts by weight, and preferably 0.01 to 5 parts by weight, based on 100 parts by total weight of non-fluoroolefin monomers.

The non-fluoroolefin monomer can be added, based on 100 parts by total weight of fluoroolefin polymer, preferably to the amount of 10 to 200 parts by weight, more preferably 20 to 80 parts by weight, still more preferably 30 to 70 parts by weight, and most preferably 40 to 60 parts by weight. Therefore, a resin composition or a chemically bonded product of the fluoroolefin polymer and the non-fluoroolefin polymer contains the non-fluoroolefin polymer preferably in the range of 10 to 200 parts by weight, more preferably 20 to 80 parts by weight, still more preferably 30 to 70 parts by weight, and most preferably 40 to 60 parts by weight based on 100 parts by weight of fluoroolefin polymer. The proportion of the fluoroolefin polymer and the non-fluoroolefin polymer in the chemically bonded product is such that, based on 1 part by weight of fluoroolefin polymer, non-fluoroolefin polymer is preferably contained in 0.1 to 2.0 parts by weight, more preferably 0.2 to 0.8 parts by weight, still more preferably 0.3 to 0.7 parts by weight, and most preferably 0.4 to 0.6 parts by weight. In the coating composition or resin composition of the present invention, even when the weight ratio of the non-fluoroolefin polymer exceeds that of the fluoroolefin polymer, significant improvement in durability and the like of the coated film can be attained compared to prior art inventions.

When seed polymerization is conducted by batch polymerization, the total amount of the non-fluoroolefin monomer is added to a fluoroolefin-polymer dispersion at the beginning of the reaction. In semicontinuous polymerization, some portion of the monomer mixture is supplied at the beginning of the reaction and the rest is supplied continuously or in batches. In continuous polymerization, the monomer mixture is supplied continuously or in batches throughout the reaction process.

As an emulsifier, an anionic surfactant, a nonionic surfactant or combination thereof may be used, and, in some cases, an amphoteric surfactant or a cationic surfactant may be used. Examples of usable anionic surfactants include sodium salts of sulfonate esters of higher alcohols, alkylbenzene sodium sulfonates, sodium dialkylsuccinate sulfonates, and sodium alkyldiphenylether sulfonates. Among these, alkylbenzene sodium sulfonates, sodium laurylsulfonate, polyoxyethylenealkyl (or alkylphenyl) ethersulfonates, etc., are preferable. Examples of usable nonionic surfactants include polyoxyethylenealkyl ethers and polyoxyethylenealkylaryl ethers. Preferably used are polyoxyethylenenonylphenyl ether, polyoxyethyleneoctylphenyl ether, etc. As amphoteric surfactants, lauryl betaine and the like are preferably used. As a cationic surfactant, for example, it is possible to use alkylpyridinium chlorides, alkylammonium chlorides, etc. It is also possible to use surfactants that are copolymerizable with monomers, for example, sodium styrenesulfonate, sodium alkylarylsulfonates, etc.

The amount of emulsifier to be used is generally about 0.05 to 5 parts by weight based on 100 parts by total weight of the fluoroolefin polymer and non-fluoroolefin monomer.

As polymerization initiators, it is possible to use any known water-soluble and oil-soluble polymerization initiators that are used to initiate ethylene polymerization.

As water-soluble polymerization initiators, for example, water-soluble persulfonate and hydrogen peroxide are usable. In some cases, polymerization initiators may be used together with reducing agents. Examples of preferably used reducing agents include such as sodium pyrosulfite, sodium hydrogen sulfite, sodium thiosulphate, L-ascorbic acid and its salts, and sodium formaldehyde sulphoxylate. Examples of oil-soluble polymerization initiators include organic peroxides and azo initiators. Examples of these compounds include 2,2'-azobisisobutyronitrile, 2,2'-azobis(4-methoxy-2,4-dimethylvaleronitrile), 2,2'-azobis-2,4-dimethylvaleronitrile, 1,1'-azobiscyclohexane-1-carbonitrile, benzoyl peroxide, dibutyl peroxide, cumene hydroperoxide, P-methane hydroperoxide, t-butylperoxy(2-ethylhexanoate), succinic acid peroxide, and diacyl peroxide. Generally, peroxydicarbonates and t-amylperoxy esters are used. It is also possible to use t-amyl hydroperoxide. It is also possible to use a mixture of initiators. Preferable initiators include cumene hydroperoxide, isopropylbenzene hydroperoxide, ammonium persulfate, isopropylbenzene hydroperoxide, p-cumene hydroperoxide, 2,2'-azobisisobutyronitrile, benzoylperoxide, t-butylhydroperoxide, 3,5,5-trimethylhexanol peroxide, and t-butylperoxy(2-ethylhexanoate). The amount of polymerization initiator used may be about 0.1 to about 3 parts by weight of the monomer mixture.

Examples of usable chain transfer agents, other than I—$(CH_2)_n$—I (wherein n is an integer from 1 to 4), include carbon tetrachloride, chloroform and like halogenated hydrocarbons; n-dodecylmercaptan, n-octylmercaptan and like mercaptans; dimethyl xanthogen disulfide, diisopropyl xanthogen disulfide and like xanthogens; and dipentene, terpinolene and like terpenes. The desirable amount of chain transfer agents used is about 0 to about 10 parts by weight based on non-fluoroolefin monomer mixture.

As chelating agents, for example, glycine, alanine and ethylenediaminetetraacetic acid are usable. As pH adjustors, for example, sodium carbonate, potassium carbonate and sodium bicarbonate are usable. The amounts of chelating agent and pH adjustor used are about 0 to about 0.1 parts by weight and about 0 to about 3 parts by weight, respectively, based on the amount of the non-fluoroolefin monomer.

It is possible to promote swelling of the seed polymer by adding a small amount of solvent during the reaction. In typical cases, these solvents may contain methyl ethyl ketone, acetone, trichlorofluoroethane, methylisobutylketone, dimethyl sulfoxide, toluene, dibutyl phthalate, methylpyrrolidone, ethyl acetate, etc., in an amount so small that it does not adversely affect ease of operation, fire safety, environmental friendliness and production safety. The amount of solvents used is about 0 to about 20 parts by weight per 100 parts by weight of monomer mixture.

To achieve excellent film formation and high-gloss of the coating, it is preferable that the particle size of the resin composition of the present invention obtained by seed polymerization be small. Generally, the particle size is about 50 to about 400 nm and preferably about 50 to about 200 nm.

It is possible to control the average particle size of the resin composition of the present invention by suitably selecting the particle size of polyvinylidene fluoride.

The z-average grain size of polymer particles can be measured using a capillary hydrodynamic fractionator (CHDF).

If desired, an additional amount of surfactant and/or pH adjustor may be added to the resulting latex to improve its storage stability and/or reactivity.

It is possible to lead the resin compositions that contain fluoroolefin polymer and non-fluoroolefin polymer obtained in the present invention to chemically bonded products by hardening (crosslinking) them using a curing agent, for example, di- or poly-isocyanate, polyaziridine, polycarbodiimide, polyoxazoline and like low-molecular-weight crosslinking agents; glyoxal, bi- and tri-functional acetoacetate and like dialdehydes; malonate, acetals, triols and acrylates, cycloaliphatic epoxy molecules, epoxy silanes, amino silanes and like organic silanes; carbamates, diamines and triamines, hydrazides, carbodiimides, inorganic chelating agents, for example, certain zinc and zirconium salts and titanates. The amount of curing agents is 1 to 50 parts by weight, and preferably 5 to 30 parts by weight, per 100 parts by total weight of fluoroolefin polymer and non-fluoroolefin polymer.

The aqueous emulsion resin composition of the present invention contains the curing agent in the amount of 1 to 50 parts by weight, preferably 2 to 30 parts by weight and still more preferably 5 to 30 parts by weight based on 100 parts by weight of resin composition or chemically bonded product of fluoroolefin polymer and non-fluoroolefin polymer.

The resin composition of the present invention may be formulated into aqueous emulsion type paints by adding additives generally used with paints, in addition to curing agents, such as pigments, dispersants, density improvers, antifoaming agents, antifreeze agents and film formation agents.

When paints and other coating materials are prepared from the resin compositions of the present invention, it is possible to add at least one water-soluble resin, selected from acrylic resins, urethane resins, epoxy resins, polyester resins, nylon resins, urea resins, alkyl resins, maleic oils, and/or water dispersible resins, selected from (meth)acrylic resins, polyvinyl acetate resins, ethylene polyvinyl acetate resins and urethane resins.

An example of the method for preparing a chemically bonded product of fluoroolefin polymer and non-fluoroolefin polymer having at lest one chemical bond at a terminus and/or a side chain of its molecule is forming a chemical bond by using the crosslinkable group(s) introduced to the polymer by the process described above.

The reaction forming the chemical bond using a crosslinkable group is conducted during or after seed polymerization. Alternatively, the reaction for forming a chemical bond using a crosslinkable group is conducted before the seed polymerization. It is also possible to achieve formation of chemical bonds by mixing a resin having crosslinkable group(s) with a curing agent, allowing progress of the crosslinking reaction, the fluoroolefin polymer and non-fluoroolefin polymer thereby being crosslinked by chemical bonding through the curing agent.

As the method for forming a chemical bond using the crosslinkable group(s) introduced into the polymer, it is preferable that monomers having a functional group that can form a chemical bond with the crosslinkable group(s) introduced into the polymer react before seed polymerization, conduct seed polymerization, and a chemically bonded product (graft polymer) between fluoroolefin polymer and non-fluoroolefin polymer then be formed. It is also preferable that seed polymerization be conducted between monomers, including monomers that contain functional group(s) that can form chemical bond(s) with the crosslinkable group(s) introduced into polymer.

Preferable examples of combinations of the crosslinkable groups in the polymer and functional groups in the monomer (fluoroolefin polymer/non-fluoroolefin polymer) include carboxyl group/epoxy group, carboxyl group/hydroxyl group, carboxyl group/amino group, hydroxyl group/epoxy group, hydroxyl group/isocyanate group, hydroxyl group/carboxyl group, epoxy group/carboxyl group, epoxy group/hydroxyl group, sulfonate group/amino group, sulfonate group/hydroxyl group, sulfonate group/epoxy group, etc. Among these, the combination of carboxyl group/epoxy group is particularly preferable.

Examples of curing agents include compounds of isocyanates, melamines, hydrazides, carbodiimides, silanes and epoxides.

Specific examples of melamine and silane curing agent are described in Japanese Unexamined Patent Publication No. 1992-279612. To be more specific, as melamines, N-methylmelamine resins, alkylated methylmelamine resins, methylol melamine resins obtained by subjecting melamine to methylol-modification; alkyl ether melamine resins obtained by subjecting methylol melamine to etherification using methanol, ethanol, butanol and like alcohols. As silanes, dimethoxydimethylsilane, dibutyldimethoxysilane, diisopropyldipropoxysilane, diphenyldibutoxysilane, diphenylethoxysilane, diethyldisilanol, dihexyldisilanolmethyltrimethoxysilane, methyltriethoxysilane, ethyltriethoxysilane, propyltrimethoxysilane, phenyltriethoxysilane, phenyltributoxysilane, hexyltriacetoxysilane, methyltrisilanol, phenyltrisilanol, tetramethoxysilane, tetraethoxysilane, tetrapropoxysilane, tetraacetoxysilane, diisopropoxydivaleroxysilane, tetrasilanol, etc., are usable.

Examples of epoxy curing agents are disclosed, for example, in Japanese Unexamined Patent Publication No. 1990-232250, Japanese Unexamined Patent Publication No. 1990-232251, etc. Specific examples are as follows:

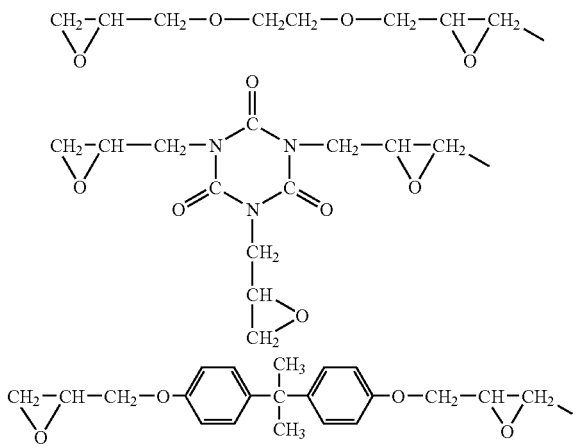

Water-soluble or water-dispersible epoxies are preferable for use in aqueous paints.

As isocyanate compounds for use in aqueous paints, polyethylene oxide-modified isocyanates are preferable. Isocyanates disclosed, for example, in Japanese Unexamined Patent Publication No. 1999-310700, Japanese Unexamined Patent Publication No. 1995-330861, and Japanese Unexamined Patent Publication No. 1986-291613 are suitably used.

Specifically, aliphatic polyisocyanates or aromatic polyisocyanates modified by emulsifiers are exemplified.

As aliphatic polyisocyanates, for example, diisocyanates [trimethylenediisocyanate; tetramethylenediisocyanate; 1,6-diisocyanatohexane (hexamethylenediisocyanate, HDI); pentamethylenediisocyanate; 1,2-propylenediisocyanate; 1,2-butylenediisocyanate; 2,3-butylenediisocyanate; 1,3-butylenediisocyanate; 2,4,4- or 2,2,4-trimethylhexamethylenediisocyanate; 2,6-diisocyanatomethylcaprorate, etc.] and polyisocyanates[lysine ester triisocyanate; 1,4,8-triisocyanatooctane; 1,6,11-triisocyanatoundecane; 1,8-diisocyanate-4-isocyanatomethyloctane; 1,3,6-triisocyanatohexane; 2,5,7-trimethyl-1,8-diisocyanate-5-isocyanatomethyloctane, etc.] are exemplified.

Examples of alicyclic polyisocyanates include diisocyanates[1,3-cyclopentenediisocyanate; 1,4-cyclohexanediisocyanate; 1,3-cyclohexanediisocyanate; 1-isocyanate-3,3,5-trimethyl-5-isocyanatomethyl-cyclohexane (isophorone diisocyanate, IPDI); 4,4'-methylenebis(cyclohexylisocyanate); methyl-2,4-cyclohexanediisocyanate; methyl-2,6-cyclohexanediisocyanate; 1,3- or 1,4-bis(isocyanatomethyl)cyclohexane, etc.]; polyisocyanates[1,3,5-triisocyanatocyclohexane; 1,3,5-trimethylisocyanatocyclohexane; 2-(3-isocyanatopropyl)-2,5-di(isocyanatomethyl)-bicyclo(2.2.1)heptane; 2-(3-isocyanatopropyl)-2,6-di(isocyanatomethyl)-bicyclo(2.2.1) heptane; 3-(3-isocyanatopropyl)-2,5-di(isocyanatomethyl)-bicyclo(2.2.1)heptane; 5-(2-isocyanatoethyl)-2-isocyanatomethyl-3-(3-isocyanatopropyl)-bicyclo(2.2.1) heptane; 6-(2-isocyanatoethyl)-2-isocyanatomethyl-3-(3-isocyanatopropyl)-bicyclo(2.2.1)heptane; 5-(2-isocyanatoethyl)-2-isocyanatomethyl-2-(3-isocyanatopropyl)-bicyclo(2.2.1)-heptane; 6-(2-isocyanatoethyl)-2-isocyanatomethyl-2-(3-isocyanatopropyl)-bicyclo(2.2.1)heptane, etc.]. Such polyisocyanates may be used alone or in combination of two or more.

Examples of emulsifiers include polyoxyethylenealkyl ethers (for example, polyoxyethylenemonooctyl ether; polyoxyethylenemonolauryl ether; polyoxyethylenemonodecyl ether; polyoxyethylenemonocetyl ether; polyoxyethylenemonostearyl ether; polyoxyethylenemonooleyl ether and like polyoxyethylene $C_{8-24}$ alkyl ethers, preferably polyoxyethylene $C_{10-22}$ alkyl ethers, and particularly polyoxyethylene $C_{12-18}$ alkyl ethers); polyoxyethylenemonoalkylaryl ether (for example, polyoxyethylenemonooctylphenyl ether; polyoxyethylenemononomylphenyl ether; polyoxyethylenemonodecylphenyl ether and like polyoxyethylene $C_{8-12}$ alkyl-$C_{6-12}$ aryl ethers); polyoxyethylenesorbitan higher fatty acid esters (e.g. polyoxyethylene sorbitan monolaurate; polyoxyethylene sorbitan monostearate; polyoxyethylene sorbitan monooleate; polyoxyethylene sorbitan distearate; polyoxyethylene sorbitan tristearate and like polyoxyethylene sorbitan mono-, di- or tri-$C_{10-24}$ fatty acid esters); polyoxyethylene mono higher fatty acid esters (e.g. polyoxyethylene monolaurate ester, polyoxyethylene monostearate ester and like polyoxyethylene mono $C_{10-24}$ fatty acid esters, etc.). Such nonionic emulsifiers may be used alone or in combination of two or more. Preferable nonionic emulsifiers include polyoxyethylene $C_{8-24}$ alkyl ethers and polyoxyethylene $C_{8-12}$ alkylphenylethers.

The proportion of the polyisocyanate and the emulsifier may be selected from the following ranges: Based on one equivalent of polyisocyanate in isocyanate groups, 0.01 to 0.034 equivalents and preferably 0.015 to 0.03 equivalents of active hydrogen atom of emulsifier.

Examples of carbodiimide compounds for use in water-based paint include Carbodilite E-01 and E-02 manufactured by Nisshinbo Industries, Inc. In addition, compounds disclosed in Japanese Unexamined Patent Publication No. 1988-264128, U.S. Pat. No. 4,820,863, U.S. Pat. No. 5,108,653, U.S. Pat. No. 5,047,588 and U.S. Pat. No. 5,081,173 are usable. Specifically, compounds represented by the following formula:

R—X—R'

[wherein X is selected from the group consisting of uretidone, diazetidinone, N-acylurea, guanidine, isourea, isothiourea and carbodiimide; R' represents poly(ethylene glycol), poly(propylene glycol), methoxypolyethylene glycol and like alkoxypolyethylene glycols, and methoxypolypropylene glycol and like alkoxypolypropylene glycols; and R is a group expressed by the following general formula:

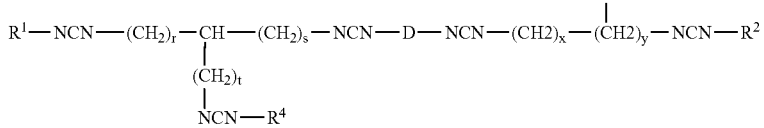

(wherein $R^1$, $R^2$, $R^3$ and $R^4$ may be the same or different and each represents an organic group that does not substantially impair the function of multifunctional carbodiimides, for example, a lower alkyl group, cycloalkyl group, aryl group, etc., D is alkylene or arylene; and r, s, t, x, y and z each represents an integer from 1 to 6), or a group represented by the following general formula:

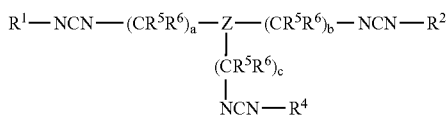

(wherein $R^1$, $R^2$ and $R^4$ may be the same or different and each represents a $C_1$ to $C_{12}$ alkyl group; $R^5$ and $R^6$ may be the same or different and each represents an alkyl, cycloalkyl, aryl, aralkyl, heterocyclic group, cyano, nitro, halo, alkyl sulfide, dialkylaminoalkyl, silane, alkoxy or aryloxy group; and Z is a residue of a compound that is suitable for functioning as a branched point, where a, b and c each represents an integer from 0 to 12); preferably, for example, 1,3,6-tri-(N-isopropyl-N'-methylenecarbodiimide)hexane; 1,3,6-tri-(N-cyclohexyl-N'-methylenecarbodiimide)hexane, 1,3,6-tri-(N-n-butyl-N'-methylenecarbodiimide)hexane.]

Examples of hydrazide compounds for use in water-based paint are as described in Japanese Unexamined Patent Publication No. 1995-268163 and Japanese Unexamined Patent Publication No. 1997-291186. Specific examples include oxalic acid dihydrazide, malonic acid dihydrazide, succinic acid dihydrazide, glutaric acid dihydrazide, adipic acid dihydrazide, isophthalic acid dihydrazide, sebacic acid dihydrazide, maleic acid dihydrazide, fumaric acid dihydrazide and itaconic acid dihydrazide and like dicarboxylic acid dihydrazides having the number of carbon atoms of 2 to 10 and preferably 4 to 6, or ethylene 1,2-dihydrazine, propylene-1,3-dihydrazine, butylene-1,4-dihydrazine and like water-soluble aliphatic dihydrazines having the number of carbon atoms of 2 to 4. Among these, adipic acid dihydrazide, isophthalic acid dihydrazide and sebacic acid dihydrazide are preferable.

Examples of pigments that can be added to the composition of the present invention include condensed azo compounds, isoindolinone, quinacridone, diketopyrrolo pyrrole, anthraquinone, dioxazine, various organic metal complexes and like organic pigments; titanium oxide (rutile type is preferable and titanium oxides subjected to alumina treatment, silica treatment or zirconia treatment are particularly preferable), red iron oxide, yellow iron oxide, black iron oxide, carbon, chromium oxide, lead chromate, white lead, molybdenum orange and like inorganic pigments; aluminum powder, stainless steel powder and like metal powders; extender pigments, etc. As extender pigments, for example, talc, silica, calcium carbonate, barium sulfate, mica, diatomaceous earth, asbestos, basic silicate, etc., are usable.

The composition of the present invention provides crosslinkable resin compositions and paint compositions that can be used to obtain coated films exhibiting excellent water resistance, solvent resistance, soil-resistance and hardness.

BEST MODE FOR CARRYING OUT THE INVENTION

The present invention is explained below in a concrete manner; however, the scope of the present invention is not limited to these examples.

Synthetic Example 1

In a 1-liter pressure-resistant reaction vessel equipped with a stirrer, were placed 500 ml of deionized water and 1.0 g of ammonium perfluorooctanoate. Dissolved air was then removed by repeated introduction of nitrogen gas with applied pressure and degassing. Subsequently, a monomer mixture comprising VdF/TFE/CTFE/$CH_2$=$CFCF_2OCF(CF_3)CF_2OCF(CF_3)$—$CH_2$—OH with a mixing ratio of 74/12/12/2 mol % was introduced into the vessel with applied pressure in such a manner that the internal pressure of the vessel at 65° C. became 2.0 MPa. Next, 0.2 g of ammonium persulfate was placed in the vessel and polymerization was conducted over 5 hours while continuously supplying the monomer mixture thereto in such a manner that the internal pressure of the vessel was maintained at 2.0 MPa. The internal atmosphere of the vessel was then returned to ordinary room temperature and atmospheric pressure to complete the polymerization, giving an aqueous polymer dispersion of the present invention. The solids content thereof was 40 wt. %.

Synthetic Example 2

An aqueous polymer dispersion of the present invention was obtained by following the same process in Example 1 except that a monomer ratio of VdF/TFE/CTFE/$CH_2$=$CFCF_2OCF(CF_3)CF_2OCF(CF_3)$—COOH was set at 74/12/12/2 mol %.

Synthetic Example 3

In a 1-liter pressure-resistant reaction vessel equipped with a stirrer, were placed 500 ml of deionized water and 1.0 g of ammonium perfluorooctanoate. Dissolved air was then removed by repeated introduction of nitrogen gas thereinto with applied pressure and degassing. Subsequently, a monomer mixture comprising VdF/HFP/CH$_2$=CFCF$_2$OCF(CF$_3$)CF$_2$OCF(CF$_3$)—COOH with a mixing ratio of 88/20/2 mol % was introduced into the vessel with applied pressure in such a manner that the internal pressure of the vessel at 65° C. became 1.8 MPa. Next, 0.2 g of ammonium persulfate was placed in the vessel and polymerization was conducted over 5 hours while continuously supplying the monomer mixture in such a manner that the internal pressure of the vessel was maintained at 1.8 MPa. The internal atmosphere of the vessel was then returned to ordinary room temperature and atmospheric pressure to complete the polymerization, giving an aqueous polymer dispersion of the present invention. The solids content thereof was 43 wt. %.

Comparative Synthetic Example 1

An aqueous polymer dispersion of the present invention was obtained by following the same process in Example 1 except that a monomer ratio of VdF/TFE/CTFE was set at 74/14/12 mol %.

Comparative Synthetic Example 2

An aqueous polymer dispersion of the present invention was obtained by following the same process in Example 3 except that a monomer ratio of VdF/HFP was set at 88/22 mol %.

Example 1

In a 2-liter four-necked flask equipped with stirrer, thermometer and reflux condenser, were placed 700 parts by weight of the aqueous polymer dispersion prepared in the same manner as in Synthetic Example 1, 5.7 parts by weight of an aqueous solution of sodium alkyl sulfosuccinate (manufactured by Kao Corporation, Rheodol OT-P, nonvolatile content of 70 wt. %), 56.3 parts by weight of methyl methacrylate (MMA), 48.2 parts by weight of n-butyl acrylate (BA), 3.6 parts by weight of acrylic acid (AAc) and 12.0 parts by weight of hydroxypropyl methacrylate (HPMA). Thereafter, the temperature was raised to 80° C. and 12 parts by weight of 3% aqueous ammonium persulfate solution was added thereto, and the mixture was subjected to polymerization at 80° C. for four hours and cooled, terminating the reaction. Next, the pH of the mixture was adjusted to 8.5 using aqueous ammonia, giving an aqueous polymer dispersion. Using this aqueous polymer dispersion and the pigment paste described below, white paint was prepared as described further below.

(Preparation of Pigment Paste)

To 10.35 parts by weight of water were added 5.25 parts by weight of Dispersant 5027 manufactured by SAN NOPCO LIMITED; 4.00 parts by weight of ethylene glycol; 70 parts by weight of CR-97 manufactured by Ishihara Sangyo Kaisha, Ltd. serving as a pigment (titanium oxide); 0.30 parts by weight of FS Antifoam 013B manufactured by Dow Corning Corporation serving as an antifoaming agent; and 10 parts by weight of 2% aqueous solution of Tylose H4000P manufactured by Clariant Corporation. The mixture was then mixed and dispersed using a sand mill, giving a pigment paste.

(Preparation of White Paint)

To 100 parts by weight of an aqueous polymer dispersion prepared in Example 1 were added 35.29 parts by weight of the pigment paste prepared in the above manner; 2.00 parts by weight of Bayhydur 3100 (hexamethylene diisocyanate derivative, self-emulsifiable) manufactured by SUMITOMO BAYER URETHANE CO., LTD serving as a water dispersible polyisocyanate compound; 2.8 parts by weight of 10% aqueous solution of Adekanol UH-420 (manufactured by ASAHI DENKA KOGYO K.K.) serving as a viscosity modifier; 5.0 parts by weight of texanol that serves as a film formation aid; and 0.1 parts by weight of FS Antifoam 013B serving as an antifoaming agent. The resulting mixture was mixed well using a mechanical mixer, preparing a white paint. Using this white paint, the following tests were conducted.

(Glossiness)

The obtained paint was spread on a glass plate using an applicator in such a manner that the thickness of the coated film became 20 μm, dried at room temperature for one week, and the glossiness thereof at a reflex angle of 60° was measured using a glossmeter (manufactured by Suga Test Instruments Co., Ltd.).

(Glossiness After Heating and Appearance)

The paint was spread on a glass plate using an applicator in such a manner that the thickness of the coated film became 20 μm, dried at room temperature for three hours and then at 120° C. for three hours, and the glossiness thereof at a reflex angle of 20° was measured using a glossmeter (manufactured by Suga Test Instruments Co., Ltd.). The appearance was visually checked.

(Hardness)

The paint was spread on a glass plate using an applicator in such a manner that the thickness of the coated film became 20 μm, dried at room temperature for one week, and the hardness thereof was measured in accordance with the method for measuring pencil hardness as defined by JIS.

(Solvent-Resistance Test)

A test plate was obtained by applying the white paint to a glass plate and drying at room temperature for 14 days. The surface of the coated film was wiped with a nonwoven fabric impregnated with methyl ethyl ketone (MEK). The wiping operation was repeated until completion of 200 reciprocal runs. After completion of the runs, coated films exhibiting neither dissolution nor deterioration of glossiness were evaluated as A, coated films exhibiting slight dissolution and deterioration of glossiness were evaluated as B, and coated films exhibiting significant dissolution and deterioration of glossiness were evaluated as C.

(Weather Resistance)

Using an airless spray gun, the paint was applied to a slate that was subjected to sealer treatment using aqueous epoxy resin sealer EM-0150 (manufactured by Sanyo Chemical Industries, Ltd.) in such a manner that the thickness of the coated film after drying became 50 μm. The applied slate was dried at room temperature for 24 hours, and further dried at 80° C. for 2 hours. The gloss retention of the coated plate was measured after being held in an accelerated weathering machine (SUV) for 2000 hours, and evaluated based on the following criteria:

Coated plates were evaluated as A when the gloss retention was 80% or higher, as B when the gloss retention was 60 to 80%, and as C when the gloss retention was 60% or less.

Example 2

In a 2-liter four-necked flask equipped with stirrer, thermometer and reflux condenser, 700 parts by weight of aqueous polymer dispersion prepared in the same manner as in Synthetic Example 2, 5.7 parts by weight of an aqueous solution of sodium alkyl sulfosuccinate (manufactured by Kao Corporation, Rheodol OT-P, nonvolatile content of 70 wt. %), 10 parts by weight of glycidyl methacrylate (GMA) and 0.5 parts by weight of triethylamine were added and reacted at 90° C. for 3 hours while stirring. The reaction mixture was then cooled to room temperature; 56.3 parts by weight of methyl methacrylate (MMA), 38.2 parts by weight of n-butyl acrylate (BA), 3.6 parts by weight of acrylic acid (AAc), and 12.0 parts by weight of hydroxypropyl methacrylate (HPMA) were placed therein; and the temperature was then raised to 80° C. Thereafter, 12 parts by weight of 3% aqueous ammonium persulfate solution was added, and the mixture was subjected to polymerization at 80° C. for four hours and cooled, terminating the reaction. Subsequently, the pH of the mixture was adjusted to 8.5 using aqueous ammonia, giving an aqueous polymer dispersion. The aqueous polymer dispersion was analyzed and evaluated in the same manner as in Example 1.

Example 3

In a 2-liter four-necked flask equipped with stirrer, thermometer and reflux condenser, were placed 700 parts by weight of aqueous fluoropolymer dispersion obtained by adding aqueous ammonia to an aqueous polymer dispersion that was prepared in the same manner as in Synthetic Example 3, in such a manner that its pH became 7.0 and further adding water in such a manner that its solids content became 40%; and 18.7 parts by weight of Newcol 707SF (an emulsifier; manufactured by Nippon Nyukazai Co., Ltd., nonvolatile content of 30 wt. %) with stirring. The temperature of the aqueous dispersion was raised to 85° C., and an emulsified solution comprising 53.0 parts by weight of methyl methacrylate (MMA), 43.2 parts by weight of n-butyl acrylate (BA), 1.8 parts by weight of acrylic acid (AAc), 10.0 parts by weight of glycidyl methacrylate (GMA), 12.0 parts by weight of diacetone acrylamide, 8.0 parts by weight of Newcol 707SF (an emulsifier; manufactured by Nippon Nyukazai Co., Ltd., nonvolatile content of 30 wt. %), 50.0 parts by weight of water, and 0.360 parts by weight of ammonium persulfate was added thereto over 1.5 hours. The mixture was then polymerized at 85° C. for one hour and cooled, terminating the reaction. Its pH was adjusted to 8.0 by adding aqueous ammonia, giving an aqueous polymer dispersion. Using this aqueous polymer dispersion, and the pigment paste described above, the following white paint was prepared:

(Preparation of White Paint)

To 100 parts by weight of aqueous polymer dispersion prepared in Example 3, were added 35.29 parts by weight of the pigment paste prepared above, 14.0 parts by weight of 5% adipic acid dihydrazide solution, 2.8 parts by weight of 10% aqueous solution of Adekanol UH-420 (manufactured by ASAHI DENKA KOGYO K. K.) serving as a viscosity modifier, 5.0 parts by weight of texanol serving as a film formation aid, and 0.1 parts by weight of FS Antifoam 013B serving as an antifoaming agent. The obtained mixture was well mixed using a mechanical mixer, preparing a white paint. Using this white paint, the following tests were conducted in the same manner as in Example 1:

Comparative Example 1

The aqueous dispersion of Comparative Synthetic Example 1 was seed polymerized, analyzed and evaluated in the same manner as in Example 1.

Comparative Example 2

The aqueous dispersion of Comparative Synthetic Example 2 was seed polymerized, analyzed and evaluated in the same manner as in Example 3.

TABLE 1

| | Synthetic Example 1 | Synthetic Example 2 | Comparative Synthetic Example 1 | Synthetic Example 3 | Comparative Synthetic Example 2 |
|---|---|---|---|---|---|
| Solids Content (wt. %) | 40 | 40 | 40 | 40 | 40 |

| | Example 1 | Example 2 | Comparative Example 1 | Example 3 | Comparative Example 2 |
|---|---|---|---|---|---|
| Glossiness (60°) | 75 | 74 | 65 | 78 | 66 |
| Glossiness after heating (20°) and appearance | 61 No irregularity of appearance | 62 No irregularity of appearance | 30 Dull surface | 75 No irregularity of appearance | 42 Dull surface |
| Hardness | H | H | B | HB | 2B |
| Solvent resistance | A | A | B | B | C |
| Weather resistance | A | A | B | A | B |

The invention claimed is:

1. An aqueous emulsion resin composition which comprises:
 (a) a resin composition containing at least one fluoroolefin polymer having crosslinkable group(s) at a terminus and/or a side chain of its molecule and at least one non-fluoroolefin polymer having crosslinkable group(s) at a terminus and/or a side chain of its molecule,
 wherein the fluoroolefin polymer consists of a fluoroolefin and a crosslinkable group-containing fluoroolefin, the crosslinkable-group-containing fluoroolefin being at least one member selected from the group consisting of a compound represented by General formula (I):

$$CF_2=CF(CF_2)_a-Y \quad (I)$$

[wherein a is an integer from 1 to 10 and Y is SO$_3$M or COOM (with M being H, NH$_4$ or an alkali metal)];

a compound represented by General formula (II):

$$CF_2=CF(CF_2CFX)_b-Y \quad (II)$$

[wherein X is F or CF$_3$, b is an integer from 1 to 5 and Y is SO$_3$M or COOM (with M being H, NH$_4$ or an alkali metal)];

a compound represented by General formula (III):

$$CF_2=CF-O-(CFX)-Y \quad (III)$$

[wherein X is F or CF$_3$, c is an integer from 1 to 10 and Y is SO$_3$M or COOM (with M being H, NH$_4$ or an alkali metal)];

a compound represented by General formula (IV):

$$CF_2=CF-O-(CF_2CFX-O)_d-CF_2CF_2Y \quad (IV)$$

[wherein X is F or CF$_3$, d is an integer from 1 to 10, and Y is SO$_3$M or COOM (with M being H, NH$_4$ or an alkali metal)];

a compound represented by General formula (V):

$$CH_2CFCF_2O-(CF(CF_3)CF_2-O)_eCF(CF_3)Y \quad (V)$$

[wherein e is 0 or an integer from 1 to 10, and Y is SO$_3$M or COOM (with M being H, NH$_4$ or an alkali metal)];

a compound represented by General formula (VI):

$$CF_2CFCF_2-O-(CF(CF_3)CF_2-O)_f-CF(CF_3)Y \quad (VI)$$

[wherein f is an integer from 1 to 10, and Y is SO$_3$M or COOM (with M being H, NH$_4$ or an alkali metal)]; and a compound represented by General formula (VII):

$$CH_2CFCF_2Rf1-(CH_2)_gX1 \quad (VII)$$

[wherein X1 is —CH$_2$OH, —COOR1 (with R1 being H, C$_1$ to C$_6$ alkyl group, Na, K, Li or NH$_4$),

and Rf1 represents a C$_1$ to C$_{40}$ alkylene group having atom/atoms substituted with fluorine or —ORf$^2$-(Rf2 represents a C$_1$ to C$_{40}$ alkylene group having atom/atoms substituted with fluorine or a C$_3$ to C$_{50}$ ether group having atom/atoms substituted with fluorine); g is 0 or an integer from 1 to 6];

wherein the non-fluoroolefin polymer consists of a non-fluoroolefin monomer or non-fluoroolefin monomers, and (b) an emulsifier-modified isocyanate wherein the modifying emulsifier is at least one member selected from the group consisting of polyoxyethylene alkyl ethers, polyoxyethylene monoalkylaryl ethers, polyoxyethylene sorbitan higher fatty acid esters, and polyoxyethylene mono higher fatty acid esters, wherein the combination of the crosslinkable group in the fluoroolefin polymer and the crosslinkable group in the non-fluoroolefin polymer is hydroxyl group (fluoroolefin polymer)/hydroxyl group (non-fluoroolefin polymer), carboxyl group (fluoroolefin polymer)/hydroxyl group (non-fluoroolefin polymer), or sulfonic acid group (fluoroolefin polymer)/hydroxyl group (non-fluoroolefin polymer).

2. A composition according to claim 1, wherein the fluoroolefin polymer is polyvinylidene fluoride.

3. A composition according to claim 1, wherein the resin composition is prepared by a seed polymerization method.

4. A composition according to claim 1, wherein the emulsifier-modified isocyanate is used in an amount of 1 to 50 parts by weight based on 100 parts by weight of the resin composition.

5. A composition according to claim 3, wherein the resin composition has a particle size of from about 50 nm to about 400 nm.

6. A composition according to claim 5, wherein the resin composition has a particle size of from about 50 nm to about 200 nm.

7. A composition according to claim 1, wherein the non-fluoroolefin monomer contains a crosslinkable-group-containing non-fluoroolefin monomer.

8. A composition according to claim 1, wherein the non-fluoroolefin monomer is at least one member selected from the group consisting of acrylic acid, methacrylic acid, maleic acid, crotonic acid, methyl acrylate, methyl methacrylate (MMA), acrylamide, methacrylamide, N-methylacrylamide, N-methylolacrylamide, N-butoxymethylacrylamide, N-methylolmethacrylamide, N-methylmethacrylamide, N-butoxymethylmethacrylamide, hydroxyethyl acrylate, hydroxyethyl methacrylate, hydroxypropyl acrylate, hydroxypropyl methacrylate, glycidyl acrylate, glycidyl methacrylate, γ-trimethoxysilane methacrylate, γ-triethoxysilane methacrylate, acrolein, and monomers represented by the general formula shown below:

$$CH_2=CR^1-COO-CHR^2-CR^3R^4-CHO$$

(wherein R$^1$ is H or CH$_3$; R$^2$ is H or a C$_1$ to C$_3$ alkyl group; R$^3$ is a C$_1$ to C$_3$ alkyl group; and R$^4$ is a C$_1$ to C$_4$ alkyl group).

9. A composition according to claim 5, wherein the resin composition contains the non-fluoroolefin polymer in the range of 10 to 200 parts by weight based on 100 parts by weight of the fluoroolefin polymer.

* * * * *